(12) United States Patent
Boegelein et al.

(10) Patent No.: US 8,356,684 B2
(45) Date of Patent: Jan. 22, 2013

(54) INDUSTRIAL TRUCK HAVING A BATTERY COMPARTMENT BASE WITH ROLLER ACCOMMODATION OPENINGS

(75) Inventors: Rolf Boegelein, Crailsheim (DE); Christoph Zeidler, Landshut (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 860 days.

(21) Appl. No.: 12/470,780

(22) Filed: May 22, 2009

(65) Prior Publication Data

US 2009/0291358 A1    Nov. 26, 2009

(30) Foreign Application Priority Data

May 23, 2008 (DE) .......................... 10 2008 024 854

(51) Int. Cl.
*B60R 16/04* (2006.01)
(52) U.S. Cl. ...................................... 180/68.5; 180/65.1
(58) Field of Classification Search .................. 180/65.1, 180/65.8, 68.5; 193/37
See application file for complete search history.

(56) References Cited

U.S. PATENT DOCUMENTS

| | | | | |
|---|---|---|---|---|
| 385,097 | A | * | 6/1888 | Condict ......................... 105/51 |
| 4,832,185 | A | * | 5/1989 | Huber ........................... 198/788 |
| 6,817,578 | B1 | * | 11/2004 | Garcia et al. ............... 244/137.1 |
| 6,938,553 | B2 | * | 9/2005 | Tamaki et al. .................. 104/34 |
| 2004/0108189 | A1 | * | 6/2004 | Itoh et al. ....................... 198/780 |
| 2005/0036861 | A1 | * | 2/2005 | Buchmann et al. ........... 414/398 |
| 2008/0006459 | A1 | * | 1/2008 | Niebuhr ....................... 180/68.5 |

FOREIGN PATENT DOCUMENTS

| | | |
|---|---|---|
| DE | 199 56 623 A1 | 6/2001 |
| DE | 10 2004 047 342 A1 | 3/2006 |
| DE | 10 2005 022 094 A1 | 11/2006 |
| DE | 10 2007 031 149 A1 | 1/2009 |
| EP | 0 030 928 A1 | 6/1981 |
| EP | 1 415 874 A2 | 5/2004 |
| JP | 2003095591 A | 4/2003 |

* cited by examiner

*Primary Examiner* — Jeffrey J Restifo
*Assistant Examiner* — Bryan Evans
(74) *Attorney, Agent, or Firm* — Rothwell, Figg, Ernst & Manbeck, P.C.

(57) ABSTRACT

An industrial truck having a battery compartment that accommodates a replaceable battery block, the battery compartment comprising at least one lateral access opening for inserting and for withdrawing the battery block, the base of the battery compartment having at least one guide track in the battery movement direction capable of supporting the battery block such that it can move relative to the battery compartment on the guide track by a support element provided on the battery block. The battery compartment base may have a plurality of roller accommodation openings into which rollers can be inserted. A separate shelf may be arranged at a distance from the battery compartment base by means of spacers, the shelf having a plurality of roller accommodation openings into which rollers can be inserted.

18 Claims, 4 Drawing Sheets

INDUSTRIAL TRUCK HAVING A BATTERY COMPARTMENT BASE WITH ROLLER ACCOMMODATION OPENINGS

SUMMARY

The present invention relates to an industrial truck, in particular a forklift truck, having a replaceable battery block and a battery compartment which accommodates the battery block, with the battery compartment comprising at least one lateral access opening for inserting and for withdrawing the battery block, with the base of the battery compartment having at least one guide track in the battery movement direction, it being possible for the battery block to be supported such that it can move relative to the battery compartment on said guide track by a support element which is provided on said battery block.

The applicant has already applied for an industrial truck of this type in the prior patent application DE 10 2007 031 149.6. In a refinement of the battery compartment base with at least one guide track which, according to one embodiment of said prior patent application, has two rail-like guide profiles on which rollers which are arranged on the battery can move, the problem faced is that, in a battery compartment configured in such a way, battery blocks which are configured in another way and which, in particular, do not have support elements or rollers which correspond to the guide profiles can be inserted into the battery compartment only with difficulty or not at all.

The object of the invention is to develop the industrial truck of said type in such a way that battery blocks which are formed in various ways can be accommodated in the battery compartment.

To this end, it is proposed, in accordance with a first aspect according to the invention, that the battery compartment base has a plurality of roller accommodation openings into which rollers which are to be associated with the battery compartment can be inserted as required.

According to a second aspect according to the invention, it is proposed that a separate shelf which is arranged at a distance from the battery compartment base by means of spacers can be inserted into the battery compartment, said shelf having a plurality of roller accommodation openings into which rollers which are to be associated with the shelf can be inserted as required.

Insertion of rollers into the battery compartment base directly or into a shelf which is arranged above said battery compartment base allows a battery block to be inserted into the battery compartment and withdrawn from the battery compartment without dedicated rolling or sliding support elements by way of its lower face on the rollers in the battery compartment base or in the shelf. Flexible accommodation of various battery blocks can be ensured by virtue of said configuration of the battery compartment base with roller accommodation openings or by inserting a separate shelf with such roller accommodation openings.

The rollers which can be inserted into the roller accommodation openings are preferably arranged in such a way that the lower face of a battery block which is supported on said rollers is situated above the at least one guide track. In this case, the arrangement of the battery block above the guide track depends firstly on the dimensioning of the rollers and secondly on the relative position of the rollers in relation to the battery compartment base. In the case of the additional shelf, it is preferred when the rollers which can be inserted into the roller accommodation openings are arranged in such a way that the lower face of a battery block which is supported on said rollers is situated above the upper face of the shelf. As a result, the battery block can be moved freely on the rollers which are inserted in the shelf. In the case of the shelf, the distance between the lower face of the battery block and the upper face of the shelf can also be determined and possibly varied by virtue of the dimensioning of the rollers and the relative positioning of said rollers in relation to the shelf.

Both in the case of rollers which are arranged in the battery compartment base and rollers which are arranged in the shelf, it is preferred that the rotation axes of the rollers are oriented orthogonally to the movement direction of the battery block in the openings, it being possible for a respective roller to be supported on the battery compartment base or on the shelf in the region of the opening edges by means of its shaft end pieces.

Protection elements which at least partially surround the respective roller are preferably provided on the lower face of the openings in the battery compartment base or in the shelf, as a result of which damage to the rollers from below can be prevented. Such damage can occur, for example, in the case of the battery compartment base when the industrial truck moves over uneven floor surfaces, with the lower face of the battery compartment base briefly coming into contact with the floor surface. In the case of the shelf, the lower face of said shelf can strike the requisite spacers, for example as said shelf is inserted into or removed from the battery compartment. Furthermore, the protection elements, which surround the rollers at the bottom in the case of the shelf, allow the shelf to be placed on the protection elements on a floor surface when said shelf is not in use.

According to a preferred variant, the rollers can be inserted into the openings by means of a respective adapter in which they are accommodated. In this case, the adapter is preferably configured in such a way that it can be inserted into the openings in the battery compartment base or in the shelf in an interlocking manner and with little play.

In the case of the adapter, the rotation axes of the rollers are also oriented orthogonally to the movement direction of the battery block in the openings, and the adapter can have lateral roller bearings in the rotation axis direction, it being possible for a respective roller to be supported on said roller bearing by means of its shaft end pieces.

In order to be able to effectively support an adapter and in order to be able to optimally transmit the forces, which act when the battery block is accommodated, from the roller, via the adapter, to the battery compartment base or to the shelf, it is proposed that the adapter has a supporting edge region which projects beyond the opening contour and by way of which the adapter rests on the battery compartment base. A supporting edge region of this type can be of continuous design or have a plurality of sections which are separated from one another, with the supporting edge region preferably being of planar design and being in surface contact with the upper face of the battery compartment base or the shelf.

According to one development, the adapter has a protection element which is connected to the supporting edge region and at least partially surrounds an inserted roller, said protection element fulfilling the same function as a protection element described above in relation to the battery compartment base or the shelf.

It is also proposed that the roller mounts of the adapter are connected to the supporting edge region, so that forces which act on the rollers or the shaft end pieces can be transmitted to the respective base via the roller mounts and the supporting edge region.

In the case of the presented variant with an adapter, a roller and an adapter can form a kind of roller module, it being possible to dispense with corresponding protection elements on the battery compartment base or on the shelf itself when the protection element is provided on the adapter.

According to one embodiment, the shaft end pieces of the rollers have recesses which are formed in such a way that the shaft end pieces have a planar mounting surface, which mounting surfaces rest on the battery compartment base or on the shelf, possibly so as to provide corresponding profile pieces, or on the roller mounts of the adapter.

It is particularly preferred when the shaft end pieces have a cross section in the form of a segment of a circle.

BRIEF DESCRIPTION OF THE DRAWINGS

The invention will be explained in greater detail below by way of example and with reference to the appended figures using two exemplary embodiments.

DETAILED DESCRIPTION OF PREFERRED EMBODIMENTS

Figure 1:
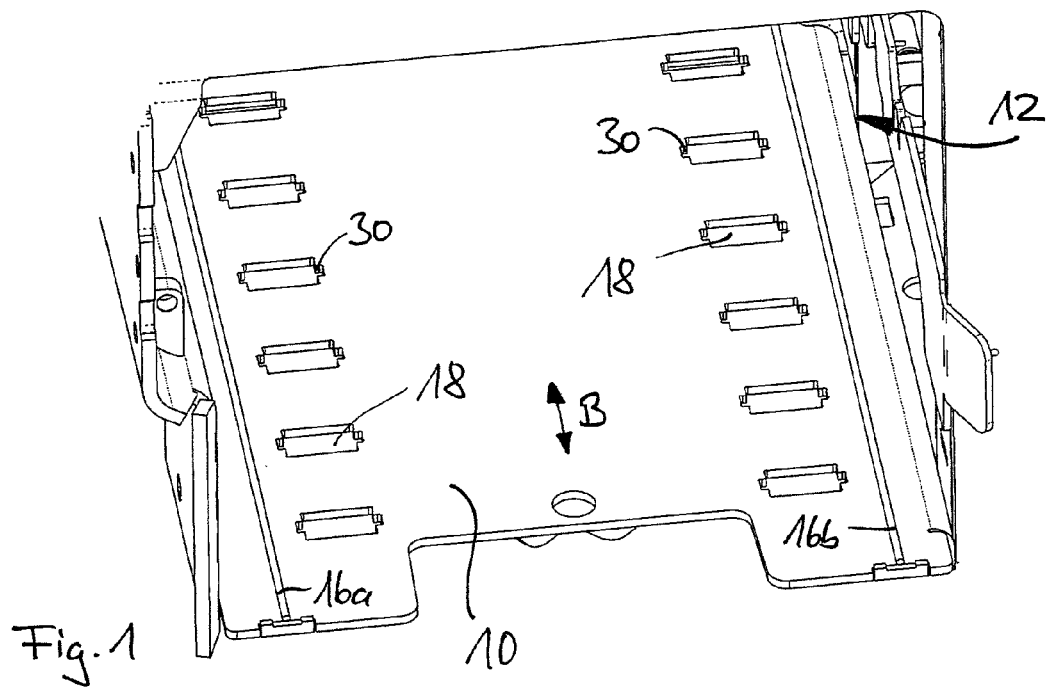
FIG. 1 shows a perspective oblique view of a battery compartment base of an industrial truck, with roller accommodation openings being formed in the battery compartment base.

FIG. 1 shows a perspective view of a battery compartment base 10 of a battery compartment 12 (only indicated), with the viewing direction selected to be from the side of an access opening for inserting and for withdrawing a battery compartment. Reference is made to the prior art and to the prior application DE 10 2007 031 149.6 with respect to the arrangement of such a battery compartment 12 on an industrial truck (not illustrated here). It should be noted that sliding shoes or the like can be provided on the battery block instead of rollers, it being possible for said sliding shoes or the like to slide along a guide track with little friction.

Two rail-like guide profiles 16a, 16b are fitted to the battery compartment base 10, a battery block with rollers arranged on it being movably supported on said guide profiles. It should be noted that the battery block can be accommodated, in particular, in a battery carriage, on which the corresponding rollers are provided, for this purpose.

A plurality of roller accommodation openings 18, into which rollers which are to be associated with the battery compartment base 10 can be inserted as required, are formed in the battery compartment base 10. In this case, the openings 18 are arranged in the vicinity of the guide tracks 16a, 16b to the left and right in relation to the viewing direction, and so the widest possible support of a battery block on the rollers which are inserted into the openings 18 is possible.

Figure 2:
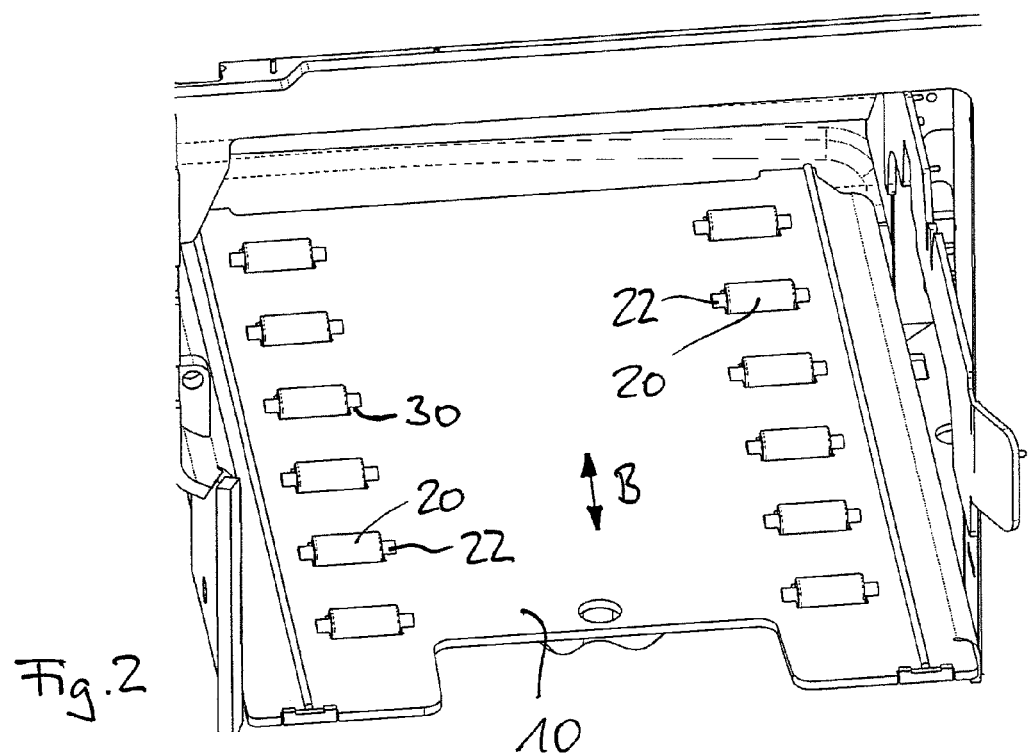
FIG. 2 shows an illustration of the battery compartment base with rollers inserted.
Figure 3:
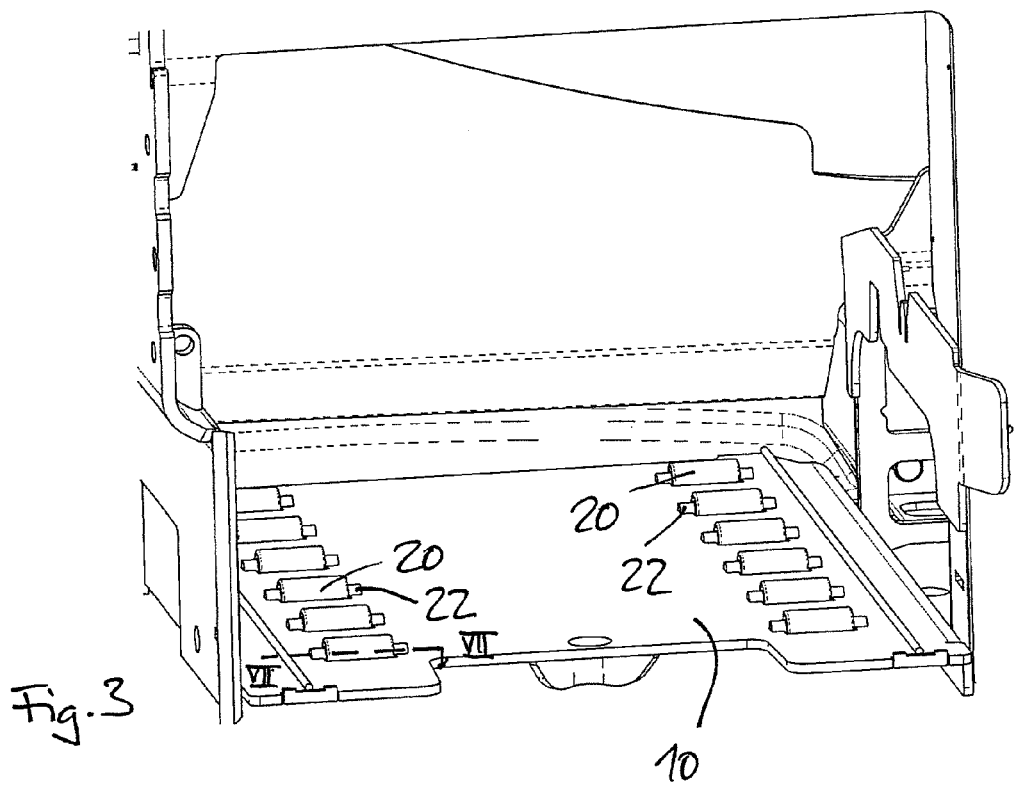
FIG. 3 shows a view of the battery compartment base of FIG. 2 from a somewhat different perspective.

FIGS. 2 and 3 show the battery compartment base 10 with rollers 20 inserted into the openings 18. In this case, the rollers 20 are supported on the battery compartment base 10 by way of their shaft end pieces 22 in the edge region of the openings 18. With the roller 20 directly supported in this way on the battery compartment base 10 by means of the shaft end pieces 22, as can be seen from the cross section according to FIG. 7a, a lower face, which is indicated by a dash-dotted line, of a battery block 23 which is supported on the rollers 22 is situated above the guide profiles 16a and 16b, and so the battery block 23 can be moved in the battery compartment, in particular inserted into or withdrawn from the battery compartment, independently of these guide profiles 16a, 16b.

Figure 5:
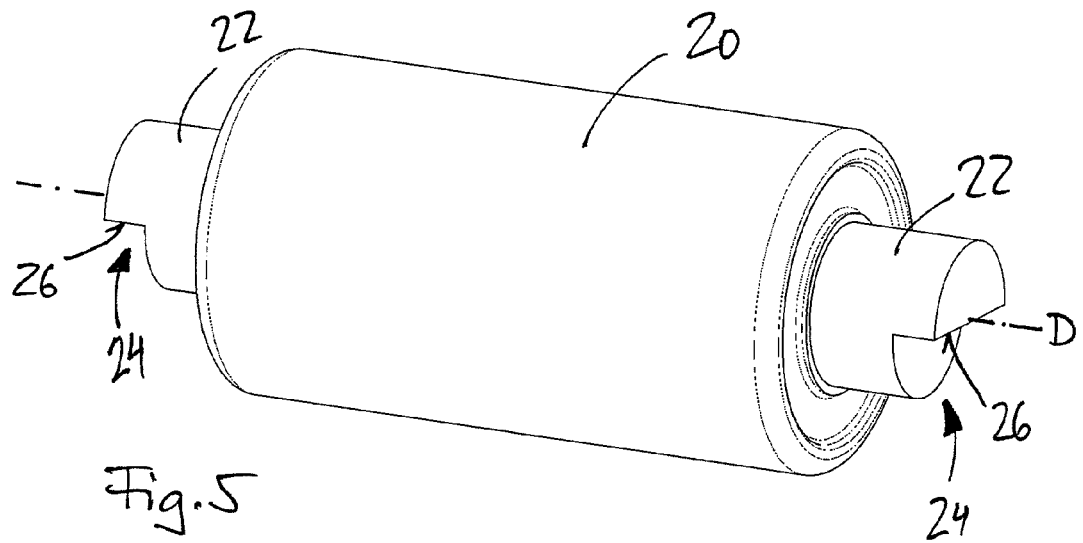
FIG. 5 shows a perspective illustration of a roller which can be inserted into the base openings.
Figure 7A:
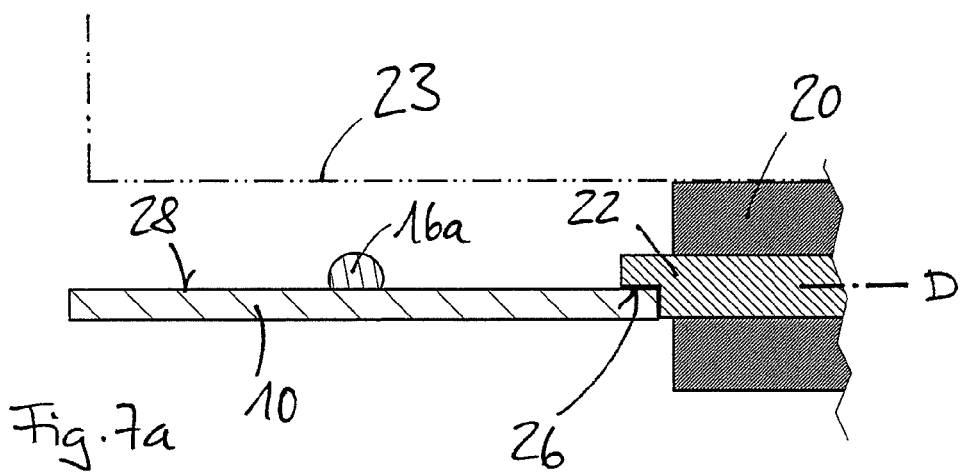
FIGS. 7a and 7b show, in the case of the embodiment with openings in the battery compartment base, the insertion of rollers by direct support of the rollers on the battery compartment base (FIG. 7a) and by support of the rollers by means of adapters (FIG. 7b), in each case in a cross-sectional view in accordance with section line VII-VII of FIG. 3.

The rollers accommodated in the battery compartment base 10 according to FIGS. 2, 3 and 7a have cutouts 24 (FIG. 5) in their shaft end pieces 22, and so the shaft end pieces 22 have a planar mounting surface 26 by way of which the rollers 20 rest on the upper face 28 of the battery compartment base 10.

On account of the cutout 24 in the shaft end piece 22, the roller 20 is also guided laterally in the opening 18 in the direction of its rotation axis D. The rollers are fixed in the movement direction B of the battery block (orthogonal to the rotation axis direction D) on account of the interlocking connection between the shaft end piece 22 and opening edges 30 which run parallel to the rotation axis direction D.

Figure 4:
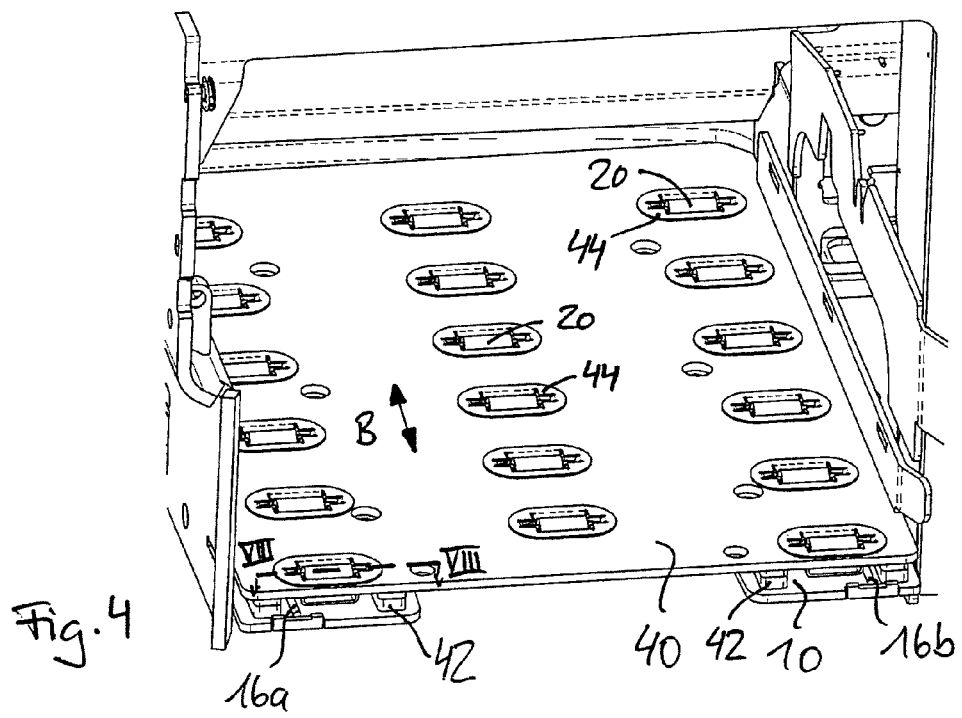
FIG. 4 shows an embodiment with a shelf into which rollers are inserted by means of an adapter.

According to the second embodiment, an additional shelf 40 is arranged above the battery compartment base 10 by means of spacers 42 in FIG. 4. Roller accommodation openings, into which rollers 20 are inserted by means of an adapter 44 in accordance with FIG. 4, are likewise formed in the shelf 40. Therefore, a battery block can be inserted into or withdrawn from the battery compartment on the rollers 20 on the shelf 40, with the configuration of the battery compartment base 10 with guide profiles 16a, 16b still not being taken into account, and so a battery block can also be accommodated on the shelf 40, said battery block not being provided with any rollers or not being accommodated in a battery carriage.

Figure 6:
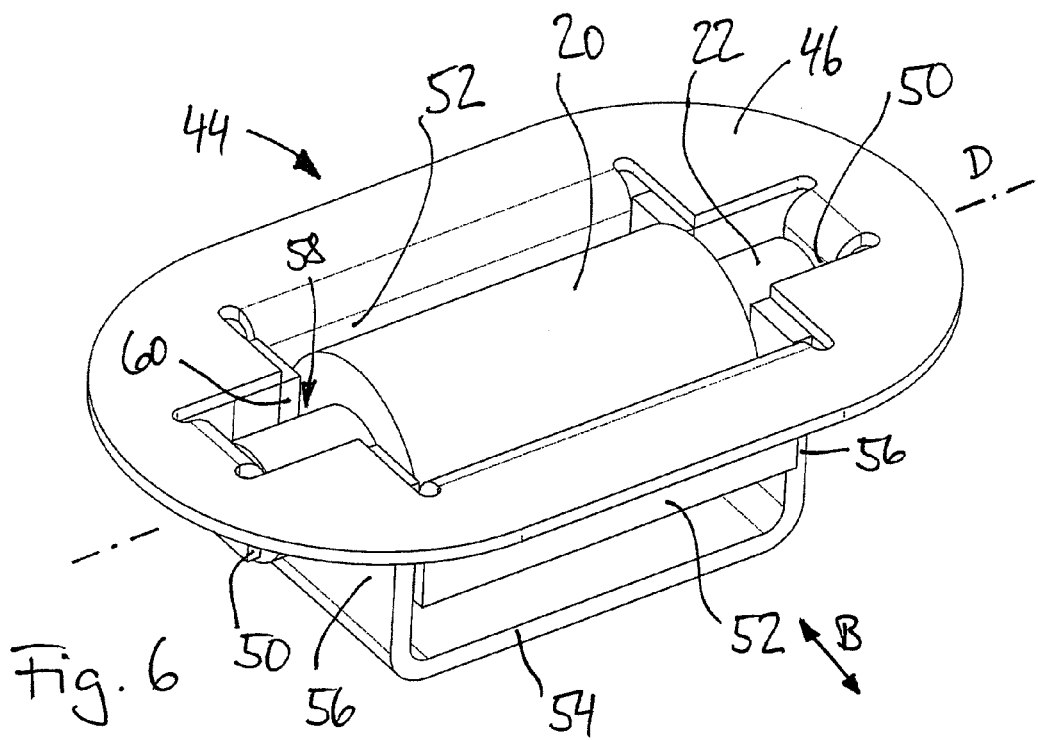
FIG. 6 shows a perspective illustration of an adapter with a roller accommodated.
Figure 8:
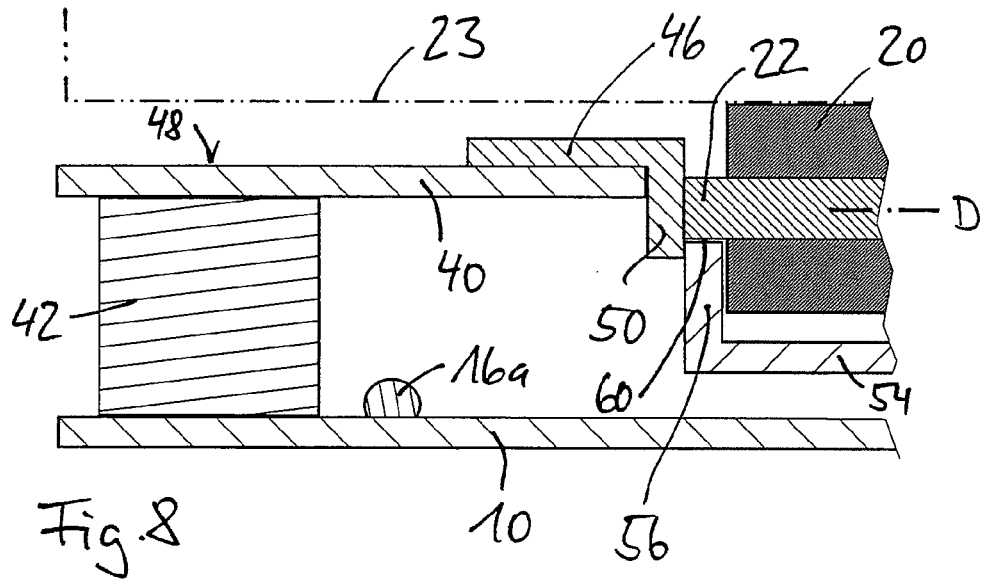
FIG. 8 shows the embodiment with a shelf in cross section in accordance with section line VIII-VIII of FIG. 6.

The adapter 44 illustrated in FIG. 6 has a supporting edge region 46 which is circumferential in the present exemplary embodiment, the adapter 44 resting on the upper face 48 of the shelf 40 at said supporting edge region, as can be seen from the cross-sectional view according to FIG. 8.

The adapter 44 has lateral guide sections 50 which are bent downward laterally in the direction of the rotation axis D and which allow the roller 20 to be guided in the rotation axis section D. Furthermore, the adapter 44 has protection sections 52 which are bent downward and which protect the roller 20 which is accommodated in the adapter 44 from the outside. Finally, an essentially U-shaped profile piece 54 which is connected, in particular welded, to the supporting edge region 46 is fitted to the adapter. Cutouts 58 are provided on the limbs 56 of the profile piece 54 which is on the side in relation to the rotation axis direction D, and so the inner edge 60 of this cutout 58 forms a lateral roller mount for the shaft end pieces 22 of the roller 20. With such a configuration of the adapter 46, shaft end pieces 22 can also be accommodated in the cutout 58, said shaft end pieces not having a planar mounting surface, but it being possible for the shaft end pieces 22 to be supported at their outer circumference by the correspondingly semicircular inner contour 60.

As can be seen from FIG. 6, the roller 20 and the adapter 44 form a kind of roller module which can be inserted into openings 18 in the battery compartment base 10 or in the shelf 40.

Figure 7B:
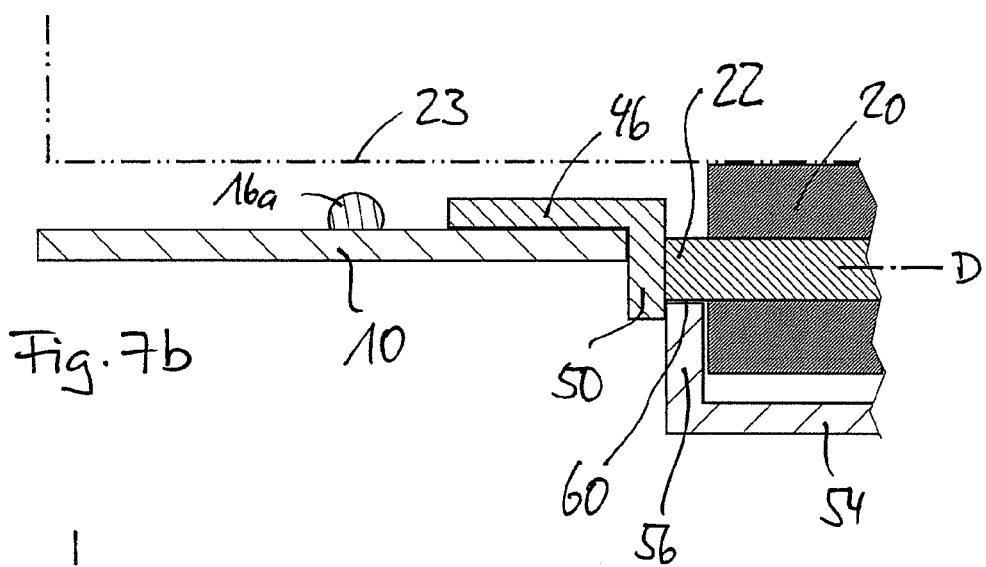

For the sake of completeness, reference is also made to FIG. 7b which illustrates the case in which a roller 20 is supported on the battery compartment base 10 by means of the adapter 44.

As already mentioned, the arrangement of rollers 20 in the battery compartment base 10 or the arrangement of a shelf 40 by means of spacers 42 provides the option of accommodating a battery block in a battery compartment without dedicated rollers, said battery compartment being designed, as standard, for the battery block to be moved on guide profiles 16a, 16b by means of dedicated rollers. Therefore, the proposed solution of rollers which can be inserted into the battery compartment base 10 or into a shelf 40 as required provides flexibility, and so various battery replacement systems and various battery blocks can be supported. The embodiment with a shelf 40, which leads to higher positioning of the inserted battery block, is of interest particularly for replacement systems in which the battery block is inserted into or removed from the battery compartment by an apparatus which allows magnetic coupling or coupling by means of vacuum (suction cup) to a battery block side wall. By virtue of using correspondingly dimensioned spacers, the shelf also allows the battery block to be raised to a special desired level which may be required for a specific replacement system.

If, for example, a novel industrial truck which is equipped with the battery compartment base 10 according to FIGS. 1-3 is purchased, a set of rollers 20 can be additionally acquired. This means that it is not only possible to use the battery block which is matched to the battery compartment base 10 with the guide profiles 16a, 16b, but that it is also possible to use another, in particular older, battery block of a previous model of the industrial track, after insertion of the rollers 20 into the openings 18.

A roller module (roller with adapter) and also rollers which can be inserted directly into the openings, can be sold together with an industrial truck. However, it is also be feasible for these rollers or roller modules to be obtained separately as a type of special equipment or as an accessory for the industrial truck.

The invention claimed is:

1. An industrial truck comprising:
a battery compartment that accommodates a replaceable battery block within, the battery compartment comprising:
at least one lateral access opening for inserting and for withdrawing the battery block in a battery movement direction, and
a base having at least one guide track in the battery movement direction capable of supporting the battery block such that the battery block is capable of moving relative to the battery compartment on said guide track by a support element provided on said battery block,
wherein the battery compartment base has a plurality of roller accommodation openings into which rollers, which are to be associated with the battery compartment base, are capable of being inserted,
wherein the rollers, when inserted in respective roller accommodation openings, are supported on the battery compartment base and are arranged in such a way that the lowermost face of a battery block supported on and contacting said rollers is situated above the at least one guide track.

2. The industrial truck as claimed in claim 1, wherein the support element is a rolling body or a sliding shoe.

3. The industrial truck as claimed in claim 1, wherein the rollers, when inserted into the roller accommodation openings, have rotation axes oriented orthogonally to the movement direction of the battery block, and a respective roller is capable of being supported on the battery compartment base in the region of edges of the opening by means of shaft end pieces of the roller.

4. The industrial truck as claimed in claim 1, wherein protection elements, which at least partially surround the respective roller, are provided on a lower face of the openings in the battery compartment base.

5. The industrial truck as claimed in claim 1, wherein the rollers are accommodated in respective adapters that are capable of being inserted into the openings.

6. The industrial truck as claimed in claim 5, wherein rotation axes of the rollers are oriented orthogonally to the movement direction of the battery block in the openings, and the adapter has lateral roller mounts in the rotation axis direction capable of supporting respective rollers by means of shaft end pieces of the respective rollers.

7. The industrial truck as claimed in claim 6, wherein the adapter has a supporting edge region which projects beyond the opening contour and by way of which the adapter rests on the battery compartment base.

8. The industrial truck as claimed in claim 7, wherein the adapter comprises at least one protection element which is connected to the supporting edge region and at least partially surrounds an inserted roller.

9. The industrial truck as claimed in claim 7, wherein the roller mounts of the adapter are connected to the supporting edge region.

10. The industrial truck as claimed in claim 3, wherein the shaft end pieces have a recesses in such a way that the shaft end pieces have planar mounting surfaces that rest on the battery compartment base or mount profiles formed on said battery compartment base, or on roller mounts of an adapter capable of being inserted into one of the openings.

11. The industrial truck as claimed in claim 10, wherein the shaft end pieces have a cross section in the form of a segment of a circle.

12. An industrial truck comprising:
a battery compartment that accommodates a replaceable battery block within, the battery compartment comprising:
at least one lateral access opening for inserting and for withdrawing the battery block in a battery movement direction, and
a base having at least one guide track in the battery movement direction capable of supporting the battery block such that the battery block is capable of moving relative to the battery compartment on said guide track by a support element provided on said battery block; and
a separate shelf arranged at a distance above the battery compartment base by means of spacers and capable of being inserted into the battery compartment, said shelf having a plurality of roller accommodation openings into which rollers, which are to be associated with the shelf, are capable of being inserted,
wherein the spacers define the distance of the separate shelf above the battery compartment base, and
wherein the rollers are capable of being inserted into the roller accommodation openings and, when inserted into the roller accommodation openings, are arranged in such a way that the lowermost face of a battery block supported on said rollers is situated above the upper face of the shelf.

13. The industrial truck as claimed in claim 11, wherein rotation axes of the rollers are oriented orthogonally to the movement direction of the battery block in the openings, and a respective roller is capable of being supported on the shelf in the region of the edges of the opening by means of shaft end pieces of the roller.

14. The industrial truck as claimed in claim 12, wherein protection elements, which at least partially surround the respective roller, are provided on a lower face of the openings in the shelf.

15. The industrial truck as claimed in claim 12, wherein the rollers are accommodated in respective adapters that are capable of being inserted into the openings.

16. The industrial truck as claimed in claim 13, wherein the shaft end pieces have a recesses in such a way that the shaft end pieces have planar mounting surfaces that rest on the battery compartment base or mount profiles formed on said battery compartment base, or on roller mounts of an adapter capable of being inserted into one of the openings and/or the shaft end pieces have a cross section in the form of a segment of a circle.

17. The industrial truck of claim 1, wherein the industrial truck is a forklift truck.

18. The industrial truck of claim 12, wherein the industrial truck is a forklift truck.

* * * * *